Feb. 27, 1940.   R. W. SCOTT ET AL   2,191,628
TRANSMISSION
Filed May 27, 1937   3 Sheets-Sheet 2
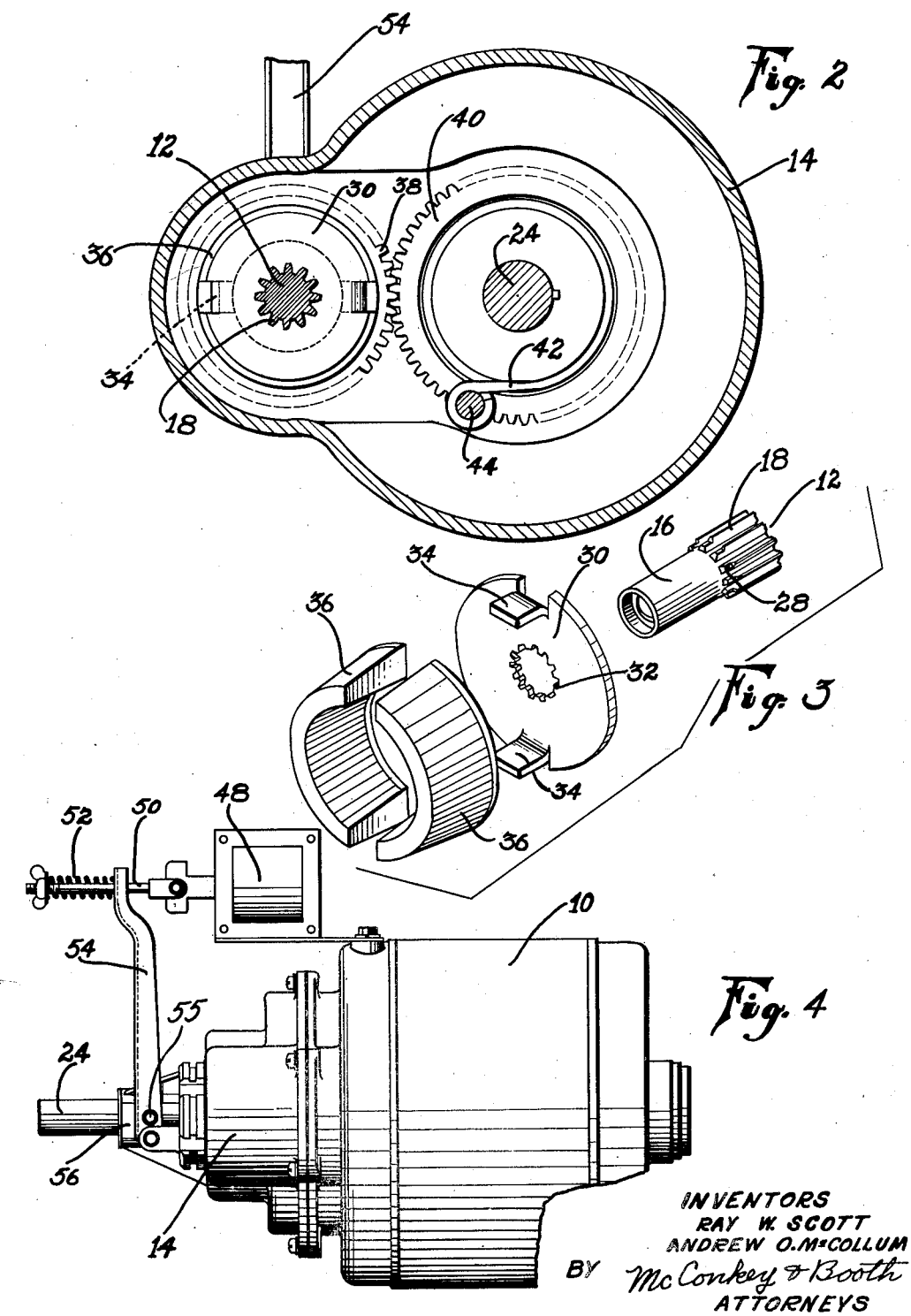
INVENTORS
RAY W. SCOTT
ANDREW O. M<sup>c</sup>COLLUM
BY McConkey & Booth
ATTORNEYS Feb. 27, 1940.  R. W. SCOTT ET AL  2,191,628
TRANSMISSION
Filed May 27, 1937  3 Sheets-Sheet 3
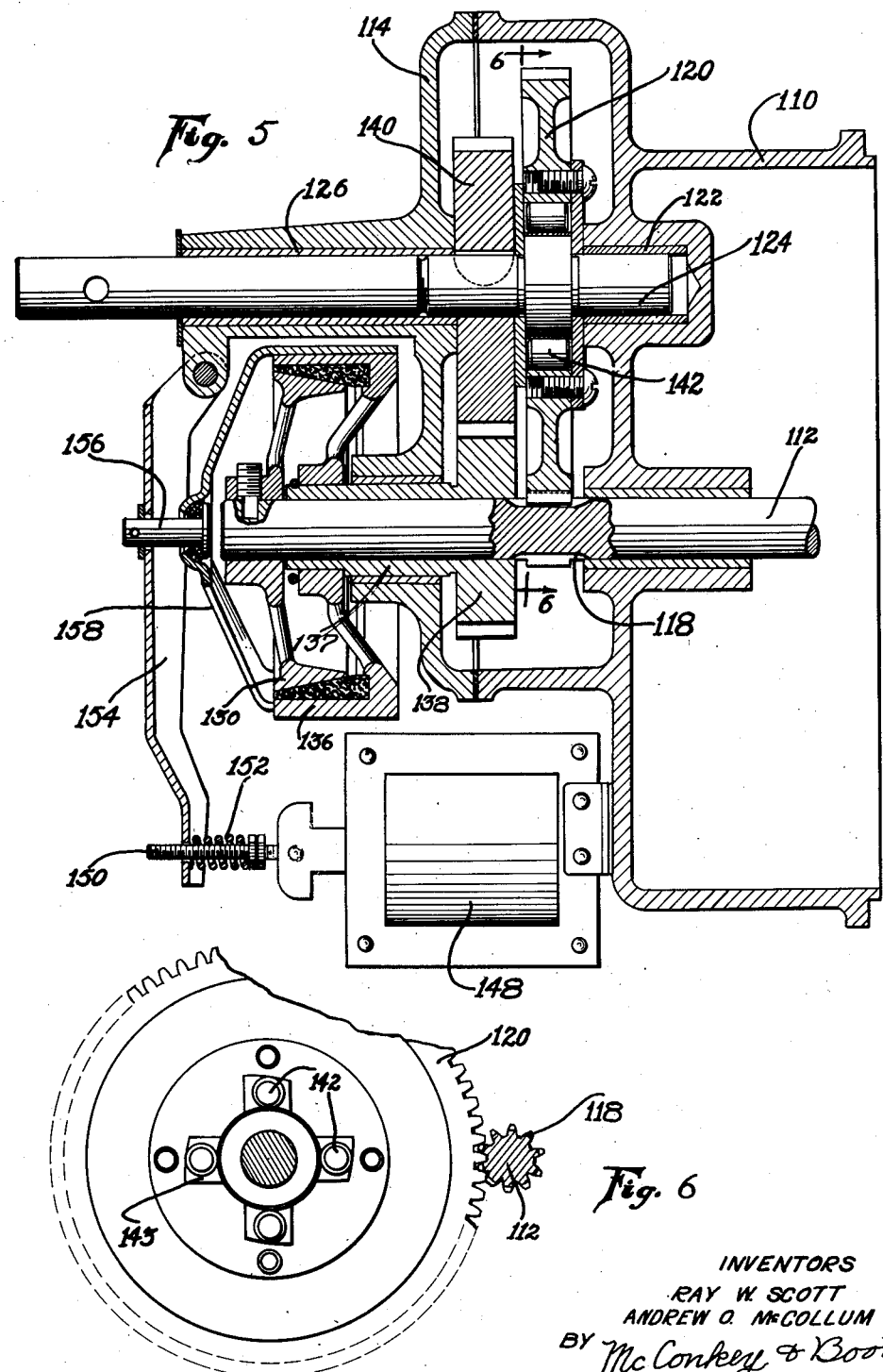
INVENTORS
RAY W. SCOTT
ANDREW O. McCOLLUM
BY McConkey & Booth
ATTORNEYS Patented Feb. 27, 1940

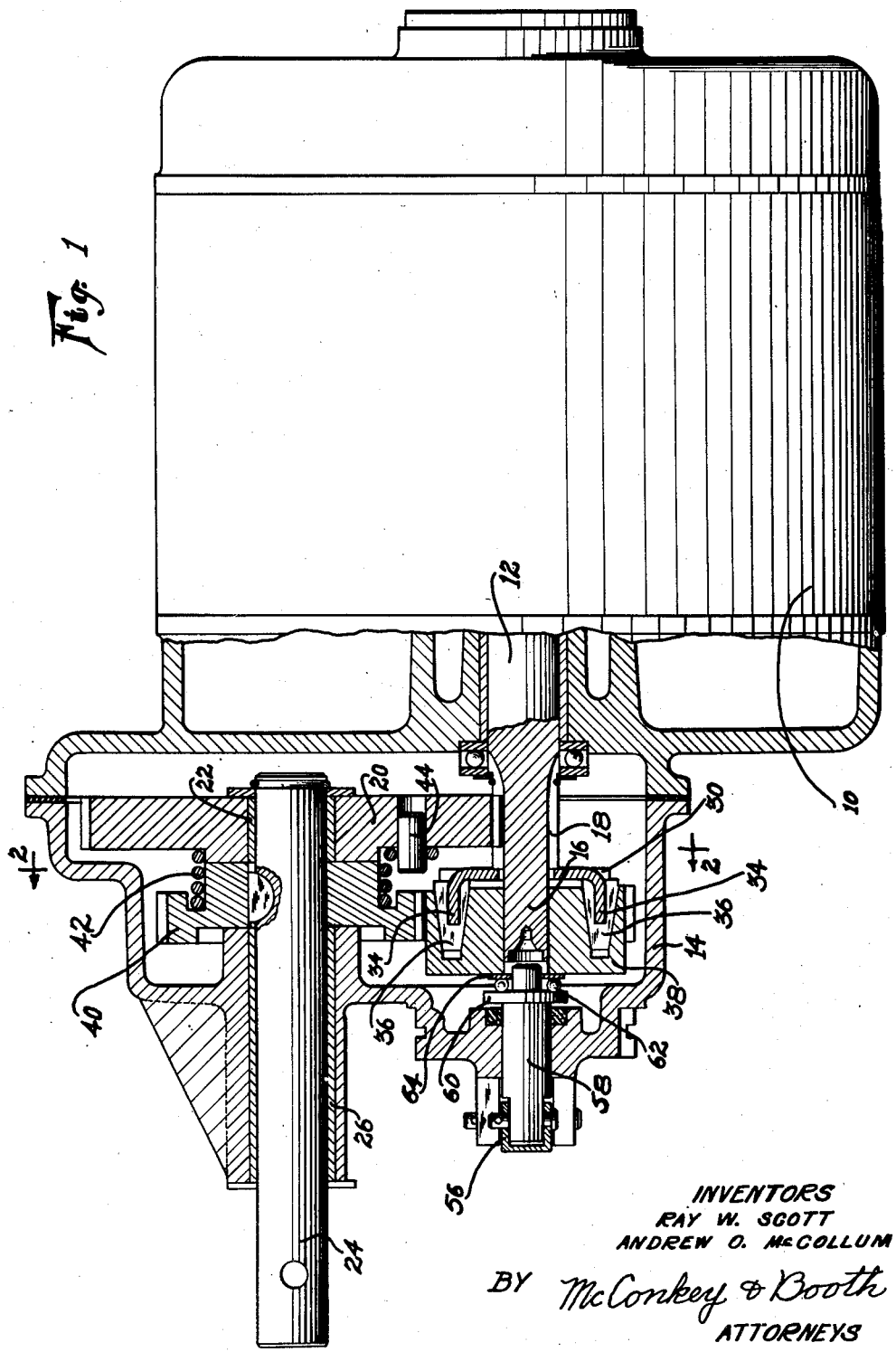

2,191,628

UNITED STATES PATENT OFFICE 2,191,628

TRANSMISSION

Ray W. Scott and Andrew O. McCollum, Detroit, Mich., assignors to Bendix Home Appliances, Inc., Detroit, Mich., a corporation of Michigan Application May 27, 1937, Serial No. 144,998

12 Claims. (Cl. 74—368)

This invention relates to multiple-speed transmissions, and is illustrated as embodied in a power unit for driving a washing machine or the like, the unit in the arrangement illustrated including an electric motor having a two-speed transmission mounted on one end of the motor casing and driven by the motor shaft.

An object of the invention is to provide a compact and reliable transmission adapted for economical manufacture on a large scale. Another object is to provide simple and rugged mechanism readily shifted from one to the other of two speeds by energizing and de-energizing a solenoid or the like, so that the transmission may be remotely controlled if desired. Another object is to utilize the armature shaft of the motor as part of the transmission mechanism, and the motor casing as part of the transmission housing, thereby securing great compactness of the unit while at the same time simplifying the structure and reducing the number of parts.

Our novel means for attaining these and other objects of the invention are described below, in two specific embodiments, and are illustrated in the accompanying drawings, in which:

Figure 1 is a top plan view of one embodiment, with the motor casing broken away and with the transmission shown in horizontal central section;

Figure 2 is a section vertically therethrough, on the line 2—2 of Figure 1;

Figure 3 is an exploded perspective view of certain of the clutch parts shown in section in Figure 1;

Figure 4 is a side elevation of the unit;

Figure 5 is a section through the transmission of a second power unit; and

Figure 6 is a partial section on the line 6—6, of Figure 5.

The embodiment of Figures 1-4 is in the form of a rigid power unit including an electric motor having a casing 10 and driven armature shaft 12, extended to form the drive shaft of the transmission. The end of the motor casing, and a separate casting 14 bolted thereto, form a housing for the transmission described below.

As best appears in Figure 3, the armature shaft 12 has at its end a smooth cylindrical reduced-diameter portion 16, between which and the motor the shaft is formed with integral pinion teeth 18 drivably meshing with the teeth of a large gear 20 loosely sleeved (with an interposed bearing 22 if desired) on a driven counter-shaft 24, shown journaled in a bearing 26 carried by the transmission housing member 14.

The shaft 24 parallels the armature shaft 12, and may be provided with a pulley or the like (not shown) for belting or otherwise connecting it to the rotor of a washing machine, for example as described in application No. 129,429, filed March 6, 1937, by Rex Earl Bassett Jr., and John W. Chamberlin.

The ends of the pinion teeth 18 are reduced in height approximately one-half at 28 (Figure 3) to form a circular series of shoulders on which is mounted a stamped steel clutch member 30 which is formed with a central opening sleeved loosely upon the reduced parts of the teeth and backed up by the shoulders formed by reducing the height of the teeth. The member 30 has inwardly-projecting teeth 32 (Figure 3) which fit between and mesh with the remaining parts of the ends of teeth 18, and which serve to key member 30 to the shaft 12. The member 30 can, however, float sufficiently to adjust its position to that of the clutch shoes.

The clutch member 30 has laterally-turned lugs 34 which project between substantially semi-circular inwardly and outwardly conical clutch shoes 36, of phenolic condensation material or other suitable friction material. These shoes are seated in a correspondingly shaped double conical recess in one face of a clutch member 38 loosely sleeved on the part 16 at the end of shaft 12.

Member 38 is exteriorly formed with teeth, so that in effect it is a gear meshing with a gear 40 keyed on the shaft 24 beside gear 20, and which is considerably smaller than the gear 20. Since the pinion formed by teeth 18 is also much smaller than the gear 38, the low-speed drive is through pinion 18 and gear 20, and the high-speed drive is through the gears 38 and 40.

The gear 40 is formed, on the side adjacent the gear 20, with a cylindrical shoulder about which is coiled a spring 42 one end of which is secured to a pin 44 carried by the gear 20. This forms a one-way connection between the gears 20 and 40, since the gear 20 can drive the gear 40 (and therefore the shaft 24) because the coils of the spring 42 tend to tighten about the shouldered portion of gear 40 in that case, whereas when the gear 40 attempts to drive the gear 20, these coils tend to unwind and loosen and therefore slip idly about the axis of gear 40. The spring 42 preferably has one or two coils about a cylindrical shoulder on the gear 20, to reduce the strain on the pin 44.

It will be seen that when there is no pressure on the clutch members 30—36—38 they separate slightly axially, and the drive is from pinion 18 to gear 20 to gear 40 to shaft 24, at low speed.

To secure high speed, a solenoid 48 is energized to move toward the right in Figure 4 a plunger 50 acting through a spring 52 yieldingly to rock a lever 54 fulcrumed on a pivot 55 on the transmission housing section 14. Lever 54 has pivoted on its end a thrust cap 56 fitting over the reduced diameter end of a thrust shaft 58, coaxial with respect to the shaft 12, and axially movable through a packed opening in the transmission housing section 14.

The shaft 58 has a flange 60 forming part of a thrust bearing having anti-friction balls 62 acting through a suitable washer 64 on the face of the gear 38 opposite the clutch member 30.

Thus rocking the lever 54 applies axial pressure shifting the gear 38 axially toward the member 30, thereby causing engagement of the clutch and causing the shaft 12 to drive the gear 38. This drives the shaft 24 directly through the gear 40 at high speed, shaft 24 and gear 40 over-running the gear 20 with the spring 42 riding idly upon the cylindrical shoulder of the gear 40.

The embodiment of Figures 5 and 6 resembles in many ways the one described above, and corresponding parts are designated by the same reference characters increased by 100.

In this case, however, the armature shaft 112 extends beyond the transmission housing section 114, and has fixed at its end a cone clutch member 130 consisting of a conical rim connected by spokes to a hub secured by a setscrew or the like to the end of the shaft.

A cooperating cone clutch member 136, inwardly faced with suitable friction material and axially movable to engage the conical periphery of member 130, is fixed to a sleeve 137 projecting from (and shown as integral with) the gear 138, the sleeve 137 being rotatably and slidably mounted in a bearing in the transmission housing section 114, and rotatably and slidably embracing the shaft 112.

A cage 158, formed as a suitable steel stamping, is secured in any desired manner to the periphery of the clutch member 136, and is connected at the axis of shaft 112 by means such as a coupling pin 156 with the lever 154 rocked by the solenoid 148. In this case, however, the lever is rocked by the solenoid in the opposite direction, and applies tension to the pin 156 and the cage 158 to cause engagement of the clutch 130—136.

The one-way connection between the gear 120 and the shaft 124 in this case consists of a one-way roller or Horton clutch, having rollers 142 in wedge slots 143 (Figure 6) and riding on an enlarged flange or collar formed integrally of the shaft 124.

In this embodiment, with the clutch 130—136 open, the drive is at low speed from shaft 112 through gear 120 and clutch rollers 142 to the shaft 124. When the clutch 130—136 is engaged, the drive is at high speed from shaft 112 through the clutch 130—136 to gear 138, and thence through gear 140 to shaft 124, the clutch rollers 142 over-running.

In both embodiments, the use of a cone type clutch is very advantageous, as it gives smooth and powerful clutching action with a very short throw of lever 54 or 154, and this is important in securing sufficiently powerful action with a solenoid, as it is very difficult to secure much power with a solenoid without making it unduly large.

It is very important in a transmission of this character to accelerate smoothly and in a gradual manner from low to high speed, by a yielding frictional engagement which picks up the load in this manner and with a slippage which constantly decreases as the speed increases. It is also important that this be done without grabbing. The above-described arrangement, with the floating clutch shoes permitting the necessary slippage to avoid stalling the motor, while causing rapid and smooth acceleration, attains this object with notable simplicity and effectiveness.

While two embodiments have been described in detail, it is not our intention to limit the scope of the invention to those particular embodiments, or otherwise than by the terms of the appended claims.

We claim:

1. Drive mechanism comprising a motor having a transmission housing at one end and having its armature shaft extending into said housing, a gear in said housing mounted on the shaft and movable axially and angularly on the shaft and which is provided with clutch means, said shaft being provided with a drive pinion between said gear and the motor, clutch means fixed on the shaft and engaged by the clutch means of said gear by movement of the gear axially of the shaft to lock said gear to the shaft, operating means for shifting said gear and its clutch means, a counter shaft paralleling the armature shaft, a small gear fixed on the counter shaft and meshing with the first gear, and a large gear on the counter shaft meshing with said pinion and having means for drivably connecting it to the counter shaft for low speed drive but permitting the counter shaft to over-run to give high speed when the clutch means is engaged.

2. Drive mechanism comprising a motor having a transmission housing at one end and having its armature shaft extending into said housing, a gear in said housing mounted on the shaft and movable axially and angularly on the shaft and which is provided with a part formed with a cone clutch surface, said shaft being provided with a drive pinion between said gear and the motor, a cooperating cone clutch member drivably mounted on the shaft and engaged by said cone clutch surface of said part by movement of the gear axially of the shaft to lock said gear drivably to the shaft, operating means for shifting said gear and its clutch part, a counter shaft paralleling the armature shaft, a small gear fixed on the counter shaft and meshing with the first gear, and a large gear on the counter shaft meshing with said pinion and having means for drivably connecting it to the counter shaft for low speed drive but permitting the counter shaft to over-run to give high speed when the cone clutch is engaged.

3. Drive mechanism comprising a motor having a transmission housing at one end and having its armature shaft extending into said housing, a gear in said housing mounted on the shaft and movable axially and angularly on the shaft and which is provided with a part formed with a cone clutch surface, said shaft being provided with a drive pinion between said gear and the motor, a cooperating cone clutch member drivably mounted on the shaft and engaged by said cone clutch surface of said part by movement of the gear axially of the shaft to lock said gear drivably to the shaft, operating means for shifting said gear and its clutch part, a counter shaft paralleling the armature shaft, a small gear fixed on the counter shaft and meshing with the first gear, and a large gear on the counter shaft meshing with said pinion and having means for drivably connecting it to the counter shaft for low speed drive but permitting the counter shaft to over-run to give high speed when the cone clutch is engaged, said first gear and said clutch part being connected by a hollow shaft journaled in a part of said housing and sleeved on said armature shaft.

4. Drive mechanism comprising a motor having a transmission housing at one end and having its armature shaft extending into said housing, a gear in said housing mounted on the shaft and movable axially and angularly on the shaft and which is provided with a part formed with a cone clutch surface, said shaft being provided with a drive pinion between said gear and the motor, a cooperating cone clutch member drivably mounted on the shaft and engaged by said cone clutch surface of said part by movement of the gear axially of the shaft to lock said gear drivably to the shaft, operating means for shifting said gear and its clutch part, a counter shaft paralleling the armature shaft, a small gear fixed on the counter shaft and meshing with the first gear, and a large gear on the counter shaft meshing with said pinion and having means for drivably connecting it to the counter shaft for low speed drive but permitting the counter shaft to over-run to give high speed when the cone clutch is engaged, said cone clutch surface being formed integrally in one side face part of the first gear.

5. A transmission comprising a drive shaft provided with pinion teeth and formed with a smooth reduced-diameter portion beyond said teeth, a gear sleeved on said smooth portion and formed with an annular recess facing toward said teeth, a clutch device extending into said recess and having a part drivably engaged by said shaft, a driven shaft paralleling the drive shaft and having fixed thereon a small gear meshing with the first gear and having sleeved thereon and connected thereto by one-way drive means a large gear meshing with said pinion teeth, and clutch-operating means for shifting the first gear axially of the drive shaft.

6. A transmission comprising a drive shaft provided with pinion teeth and formed with a smooth reduced-diameter portion beyond said teeth, a gear sleeved on said smooth portion and formed with an annular recess facing toward said teeth, a clutch device extending into said recess and having a part drivably engaged by said shaft, a driven shaft paralleling the drive shaft and having fixed thereon a small gear meshing with the first gear and having a cylindrical extension on one side, a large gear sleeved on the driven shaft and meshing with said pinion teeth, a spring coiled about said extension and anchored to said large gear, and clutch-operating means for shifting the first gear axially of the drive shaft.

7. A transmission comprising a drive shaft provided with pinion teeth and having a smooth reduced-diameter portion beyond the teeth, said teeth being of reduced height adjacent the smooth shaft portion to form shoulders at their ends, a gear sleeved on said smooth shaft portion, means for clutching said gear to the shaft including a member seated on said shoulders to be backed up by said teeth and having projections extending between said teeth to key it to the shaft, clutch-operating means for shifting the gear axially of the shaft, and a driven shaft having fixed thereon a small gear meshing with the first gear and having sleeved thereon and connected thereto by one-way drive means a large gear meshing with said pinion teeth.

8. A transmission comprising a drive shaft provided with pinion teeth and having a smooth reduced-diameter portion beyond the teeth, said teeth being of reduced height adjacent the smooth shaft portion to form shoulders at their ends, a gear sleeved on said smooth shaft portion, means for clutching said gear to the shaft including a member seated on said shoulders to be backed up by said teeth and having projections extending between said teeth to key it to the shaft, and clutch-operating means for shifting the gear axially of the shaft, a counter shaft, and gears on the counter shaft cooperating with the gear and pinion and constructed and arranged to drive the counter shaft by means of the pinion when the clutch is disengaged and by means of the gear when the clutch is engaged.

9. A transmission comprising a drive shaft provided with pinion teeth and formed with a smooth reduced-diameter portion beyond the teeth, a hollow shaft sleeved on said smooth shaft portion and having a gear on one end and a cone clutch member on the other end, a cooperating cone clutch member fixed to the end of the drive shaft, a clutch-operating part extending around the second clutch member and engaging the first clutch member, a clutch lever swiveled to said part in line with the common axis of said shafts, and a driven counter shaft having fixed thereto a small gear meshing with the first gear and having sleeved thereon and connected thereto by one-way drive means a large gear meshing with the pinion teeth.

10. A transmission comprising a casing, a drive shaft journaled in one wall of the casing and provided within said casing with pinion teeth and formed with a smooth reduced-diameter portion beyond the teeth, a hollow shaft sleeved on said smooth shaft portion and journaled in the other wall of the casing and having within the casing a gear and having outside the casing a cone clutch member, a cooperating cone clutch member fixed to the end of the drive shaft beyond the hollow shaft, a clutch-operating part extending around the second clutch member and engaging the first clutch member, a clutch lever fulcrumed on the casing and swiveled to said part in line with the common axis of said shafts, and a driven counter shaft journaled in said casing and having fixed thereto a small gear meshing with the first gear and having sleeved thereon and connected thereto by one-way drive means a large gear meshing with the pinion teeth.

11. A transmission comprising a drive shaft, a hollow shaft sleeved on said smooth shaft portion and having a gear on one end and a cone clutch member on the other end, a cooperating cone clutch member fixed to the end of the drive shaft, a clutch-operating part extending around the second clutch member and engaging the first clutch member, and a clutch lever swiveled to said part in line with the common axis of said shafts.

12. Drive mechanism comprising a motor having a transmission housing at one end and having its armature shaft extending into said housing, a gear in said housing mounted coaxially with said shaft and movable axially and angularly relatively to said shaft and which is provided with clutch means, a pinion drivably connected to the shaft, clutch means drivably connected to the shaft and engaged by the clutch means of said gear by movement of the gear axially of the shaft to lock said gear to the shaft, operating means for shifting said gear and its clutch means, a counter shaft paralleling the armature shaft, a small gear fixed on the counter shaft and meshing with the first gear, and a large gear on the counter shaft meshing with said pinion and having means for drivably connecting it to the counter shaft for low speed drive but permitting the counter shaft to over-run to give high speed when the clutch means is engaged.

RAY W. SCOTT.
ANDREW O. McCOLLUM.